R. SCHNEIDER.
COMBINATION GAS STOVE AND WATER BOILER.
APPLICATION FILED SEPT. 23, 1908.
938,021.
Patented Oct. 26, 1909.
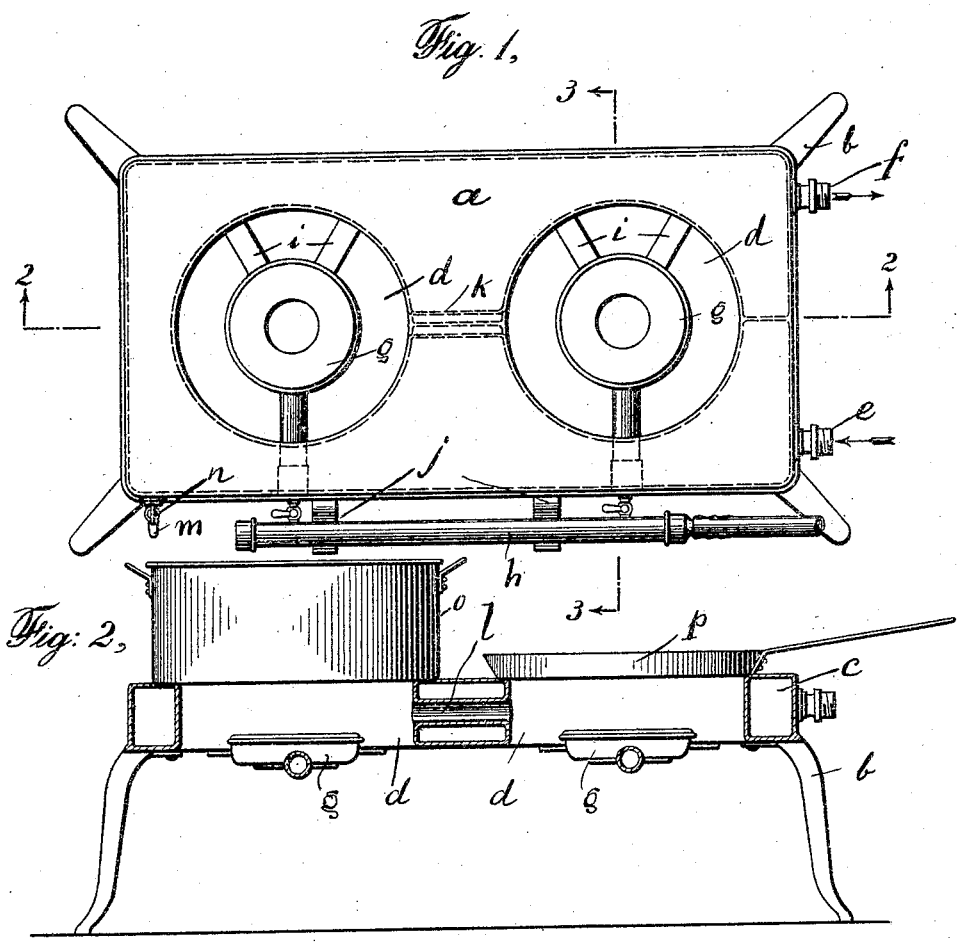
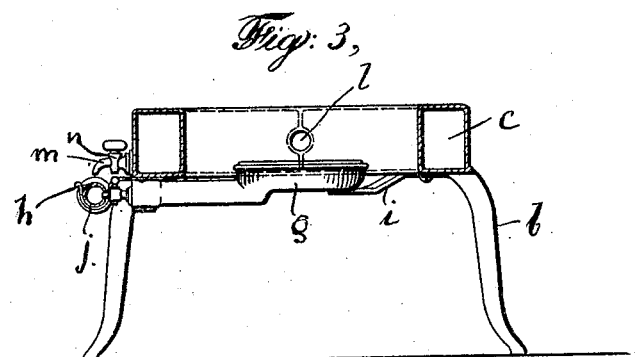
Witnesses:
N. Gaertner.
J. Luttinger.
Richard Schneider, Inventor
By his Attorney

UNITED STATES PATENT OFFICE.

RICHARD SCHNEIDER, OF CORONA, NEW YORK.

COMBINATION GAS-STOVE AND WATER-BOILER.

938,021.

Specification of Letters Patent. Patented Oct. 26, 1909.

Application filed September 23, 1908. Serial No. 454,404.

*To all whom it may concern:*

Be it known that I, RICHARD SCHNEIDER, a subject of the Emperor of Austria-Hungary, residing at Corona, in the county of Queens and State of New York, have invented certain new and useful Improvements in Combination Gas-Stoves and Water-Boilers, of which the following is a specification.

The present invention relates to gas stoves and particularly to a combination gas stove and water boiler and has for its object to provide a construction which will allow of the heat of the gas flame or flames used for cooking, boiling or frying being utilized to simultaneously heat the water contained in the water boiler.

To accomplish my object the top of the gas stove which contains the pot holes is formed as a receptacle which is provided with an inlet and a discharge opening and by a partition is so divided as to cause the water admitted into the receptacle to flow around the pot holes and to be discharged through the other opening.

The gas stove and water boiler may be constructed so as to form a single body to be used in place of the ordinary gas stoves or may be made of two separate parts, as shown in the present example, to be detachably connected to one another.

To make my invention more clear the same is illustrated in the accompanying drawing in which similar reference letters denote corresponding parts and in which—

Figure 1 is a top plan view; Fig. 2 a longitudinal section on line 2—2 of Fig. 1, and Fig. 3 a cross section on line 3—3 of Fig. 1.

The top *a* of the gas stove which is supported upon legs *b* is formed as a receptacle *c* and provided with a number of pot holes *d* (in the present example two). At one side of the receptacle there is an inlet *e* to be connected with the water supply pipe (not shown) and a discharge *f* to be connected with any receptacle which is to be supplied with hot water.

To the bottom of the receptacle *c* the ring-shaped perforated gas burners *g* connected with the gas supply pipe *h* may be suitably secured to extend below and concentrically with the circular pot holes. In the present example the ring-shaped gas pipes are detachably secured to the receptacle *c* and for this purpose the latter is provided with arms or brackets *i* and *j*, of which arms *i* support the ring-shaped burners and the arms *j* the supply pipe. By partitions *k* the receptacle is divided into two compartments which at the side opposite the inlet and discharge openings are in open communication with one another. The partition between the pot holes may be formed with a hot air passage *l*.

In addition to the discharge *f* there may be a separate discharge *m* provided with a cock *n* which, when necessary, will allow the direct discharge of hot water from the water basin.

The gas flame or flames which are used for cooking, boiling or frying the contents of the pot *o* or pan *p* placed over the pot holes will simultaneously heat the walls of the water receptacle and consequently the water admitted through the inlet *e* and flowing around said walls. The heated water can be discharged through the discharge opening *f*, into a bath tub or any other receptacle. When one flame only is used the heated air will be allowed to flow through the passage *l* and to heat the walls around the other pot hole.

What I claim and desire to secure by Letters Patent is:—

In a gas stove, a top formed as a receptacle, having an inlet and a discharge and provided with pot holes, a partition therein between the pot holes and a passage formed in the said partition, arms secured to the bottom of said receptacle, gas burners and a gas supply pipe supported by said arms.

In testimony whereof I affix my signature in presence of two witnesses.

RICHARD SCHNEIDER.

Witnesses:
JULIUS ECKERT,
MAX D. ORDMANN.